April 5, 1932.  J. R. FOSTER  1,852,454
CONDUIT CONNECTER
Filed Sept. 30, 1929
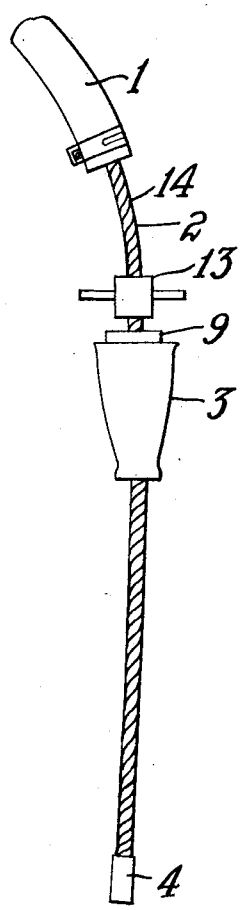
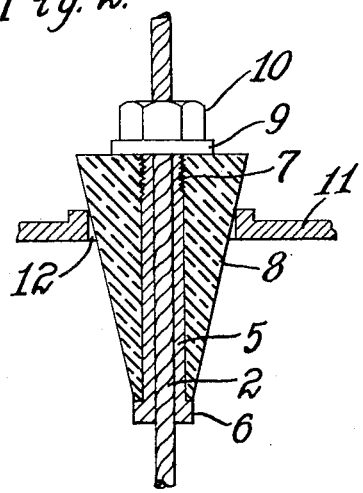
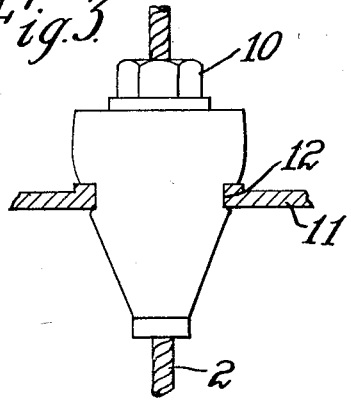
INVENTOR.
John R. Foster
BY William B. Jaspert
ATTORNEYS.
WITNESS:
H. T. Procter Patented Apr. 5, 1932

1,852,454

UNITED STATES PATENT OFFICE

JOHN R. FOSTER, OF ROCHESTER, PENNSYLVANIA, ASSIGNOR TO CORRECT MEASURE COMPANY, OF ROCHESTER, PENNSYLVANIA, A CORPORATION OF PENNSYLVANIA

CONDUIT CONNECTER

Application filed September 30, 1929. Serial No. 396,162.

This invention relates to connectors for flexible conduits or the like, by means of which a sealed connection is effected with the opening through which the conduit member may be projected.

It is among the objects of this invention to provide an expansible connector which is adapted to be inserted in the opening of a housing or casing and expanded therein to seal off the connection to prevent the escape of liquid, such connectors being particularly applicable for use in connecting flushing apparatus to gear cases or the like of automobile vehicles.

These and other objects will become more apparent from a consideration of the accompanying drawings in which like reference characters designate like parts and in which Fig. 1 is an elevational view of a flexible conduit and connector embodying the principles of this invention; Fig. 2 is a cross sectional view of the connector inserted in the opening of the casing or housing; and Fig. 3 illustrates the connector after it has been expanded to seal off the opening.

In the drawings, 1 designates a hose or pipe line leading to a source of fluid under pressure; 2 designates a flexible conduit; 3 generally designates a sealing connector and 4 a nozzle member.

Although the invention may be adapted for use generally where a liquid spray is injected into a closed housing, it is particularly adapted for use in flushing apparatus for cleaning grease from transmission and gear casings by flushing out the grease with a spray of kerosene or carbon oil, and subsequently withdrawing the flushing fluid from the gear case by suction.

To render a spray for this purpose most effective, it is desirable to provide for the adjustment of the spray nozzle within the housing or casing to be flushed after the connection has been made with the housing and for this purpose the flexible conduit 2 is preferably made of metal such as armored conduit or it can be made of copper or lead pipe. The connector comprises a sleeve or bushing 5 of metal having an opening of such dimensions as to provide a sliding connection or fit with the flexible conduit 2 and having a flanged end 6 and a threaded end 7. The rubber bushing 8 is pressed on a sleeve 5 and rests against the flange 6 thereof, the bushing 8 being tapered as shown in Fig. 2 for the purpose of rendering it insertable in various sized openings which may be found in transmission or gear cases to which the spray is to be applied. A collar or washer 9 is adapted to engage the large end of the rubber bushing 8 and a nut member 10 is adapted to interact with the thread 7 of sleeve 5 to cause pressure to bear in an axial direction against the washer 9 whereby the rubber bushing 8 is compressed and expanded radially.

In Figs. 2 and 3, 11 designates a portion of a gear case having an opening 12 therein in which the rubber plug or bushing 8 is inserted. By turning nut 10 on its thread, the rubber bushing will be expanded and distorted to envelop the edges of the opening 12 in the manner illustrated in Fig. 3, thus sealing off the connection of the conduit with the casing 11. When the connection is so made, the fluid conducted to the housing cannot flow out at the opening 12 and the spray nozzle at the end of the flexible conduit 2 is nevertheless movable within the housing, to direct the spray of diluting and flushing fluid against all the mechanism contained in such housing.

As shown in Fig. 1, a nut element 13 may be employed which is provided with grooves corresponding to spiral grooves and projections of the armored cable 2 but with this type of expansion member the cable is not movable in the sealer once a connection with the gear casing has been made.

It is evident from the foregoing description of this invention that a sealing connector as therein provided effectively seals the connection of spraying member with a gear casing or the like to permit flushing of such casing with fluid under pressure without entailing the discomfort and nuisance of having the grease flow out of the case. Furthermore, the sealed connection aids in evacuating the casing after the flushing medium has been sprayed therein.

Although one embodiment of the invention has been herein illustrated and described, it will be obvious to those skilled in the art that various modifications may be made in the details of construction without departing from the principles herein set forth.

I claim:

1. The combination with a flushing nozzle of a sealing member comprising a sleeve in sliding engagement with said nozzle resilient material mounted on said sleeve and nut mechanism on said nozzle and cooperating with said sleeve for compressing said resilient material to cause it to expand radially outwardly.

2. The combination with a helically grooved flexible conduit of a sealing member comprising a sleeve in sliding engagement with said conduit, resilient material mounted on said sleeve and a nut mechanism adapted to interact with the grooves of said conduit for causing pressure to bear in an axial direction on said resilient material to expand the latter in a radial direction.

In testimony whereof I have hereunto set my hand this 28th day of September, 1929, at Rochester, Pa.

JOHN R. FOSTER.